United States Patent [19]

Tsuzuki

[11] Patent Number: 5,545,041
[45] Date of Patent: Aug. 13, 1996

[54] EARTH GLOBE

[75] Inventor: Mikihisa Tsuzuki, Tajimi, Japan

[73] Assignee: Kazuyuki Katsuno, Tajimi, Japan

[21] Appl. No.: 339,181

[22] Filed: Nov. 10, 1994

[30] Foreign Application Priority Data

Nov. 11, 1993 [JP] Japan .................. 5-307280

[51] Int. Cl.⁶ .................................................. G09B 27/08
[52] U.S. Cl. ......................... 434/136; 434/143; 434/145
[58] Field of Search .................................. 434/131, 132, 434/136, 142, 143, 145; 368/15, 17

[56] References Cited

U.S. PATENT DOCUMENTS

| | | | |
|---|---|---|---|
| 1,959,601 | 5/1934 | Schulse | 434/143 X |
| 3,305,946 | 2/1967 | Gardin | 434/143 |
| 4,102,121 | 7/1978 | Veazey . | |
| 4,493,648 | 1/1985 | Suzuki . | |
| 4,666,310 | 5/1987 | Snapka | 434/143 X |
| 4,714,351 | 12/1987 | Domen | 368/17 |
| 4,936,779 | 6/1990 | Carlson | 434/145 X |

FOREIGN PATENT DOCUMENTS

| | | |
|---|---|---|
| 0217707 | 4/1987 | European Pat. Off. . |
| 0441678 | 8/1991 | European Pat. Off. . |
| 1425541 | 12/1964 | France . |
| 1437285 | 6/1965 | France . |
| 1206185 | 12/1965 | Germany . |

Primary Examiner—Cary E. O'Connor
Assistant Examiner—Jeffrey A. Smith
Attorney, Agent, or Firm—Dennison, Meserole, Pollack & Scheiner

[57] ABSTRACT

An earth globe includes a base and a hollow globe body made of translucent material and having a spherical configuration corresponding substantially to the earth. A first support mechanism serves to rotatably support the globe body relative to the base around a first axis corresponding substantially to the earth axis. An illumination device and a shading device are disposed within the globe body. The shading device serves to shade light from the illumination device over a substantially half region of the globe body. A second support mechanism is provided to rotatably support the shading device relative to the globe body around a second axis corresponding substantially to an axis perpendicular to the orbital plane of revolution of the earth around the sun. A first and a second drive device are provided to rotate the globe body around the first axis at a first rotational speed and to rotate the shading device around the second axis at a second rotational speed different from the first rotational speed, respectively.

15 Claims, 5 Drawing Sheets

EARTH GLOBE

BACKGROUND OF THE INVENTION

1. Field of the Invention

The present invention relates to an earth globe.

2. Description of the Prior Art

A conventional earth globe includes a spherical globe body on which a map is drawn. The globe body is rotatably supported by a base around an axis which is inclined relative to a vertical axis and which corresponds to the earth axis. A user can therefore refer to a particular part of the map by rotating the globe body, and such rotation may represent the rotation of earth.

In some designs, the earth globe is so constructed as to show a day region and a night region on the earth. Such an earth globe includes a hollow spherical globe body made of translucent material. The spherical globe body includes a lamp and a shading plate therein. The shading plate serves to prevent a predetermined half area of the spherical globe body from being irradiated by light of the lamp. With this construction, when the lamp is lit, the predetermined half area shaded by the shading plate is dark as viewed from the outside, while the remaining half is bright due to the irradiation of light. Therefore, the user can distinguish the day and night areas from each other based on the state that the light is irradiated thereto or not.

Meanwhile, the earth revolves around the sun or performs an orbital movement while rotating around its own axis or the earth axis. Since the earth axis is inclined relative to the axis perpendicular to the orbital plane of the earth, the light from the sun is irradiated to the earth in different ways in response to changes of position of the earth along the revolution orbit (changes of the season). Therefore, in order to show the change of night and day (change in the direction of sunlight) in response to changes of the season, the user requires to change the position of the lamp as well as the position of the shading plate within the spherical globe body.

Earth globes shown in FIGS. 5 and 6 have been proposed to permit such changes of positions of the lamp and the shading plate. The earth globe shown in FIG. 5 includes a spherical globe body E rotatable around an axis corresponding to the earth axis. A vertical shaft J is disposed within the spherical globe body E and extends through the center of the spherical globe body E. A lamp L and a shading plate P are mounted on the vertical shaft J. A knob T manually operable by the user is disposed outside of the spherical globe body E. A gear mechanism H is disposed within the spherical globe body E for transmitting rotation of the knob T to the vertical shaft J. Thus, when the user turns the knob T, the lamp L as well as the shading plate P is rotated together with the vertical shaft J, so that the area to be irradiated can be changed.

The construction of the earth globe shown in FIG. 6 is the substantially same as the earth globe shown in FIG. 5 except the arrangement of the gear mechanism H and the knob T.

With the above conventional earth globes shown in FIGS. 5 and 6, the lamp L and the shading plate P are rotated manually and independently of the rotation of the spherical globe body E, and therefore, it is difficult for the user to understand the correlation between the rotation and the revolution of the earth. Further, since the operation for rotating the spherical globe body E and that for rotating the knob T must be performed separately from each other, such operations are very troublesome. Additionally, for this reason, the user cannot observe the continuous change of day and night in the earth over a long period of time such as one year.

Therefore, these conventional earth globes will not provide a sufficient study aid. Further, they are not amusing since they do not change their appearances unless they are manually operated by the user. For the same reason, they are not suitable for use as interior ornamental articles.

SUMMARY OF THE INVENTION

It is, accordingly, an object of the present invention to provide an earth globe which permits a user to visually grasp the rotation and the revolution of the earth as well as change of day and night in connection with such rotation and revolution.

It is another object of the present invention to provide an earth globe which may provide an excellent study aid and to improve an ornamental effect when used as an interior ornamental article.

According to the present invention, there is provided an earth globe comprising:

a base;

a hollow globe body made of translucent material and having a spherical configuration corresponding substantially to the earth;

a first support mechanism for rotatably supporting the globe body relative to the base around a first axis corresponding substantially to the earth axis:

an illumination device disposed within the globe body for illuminating the interior thereof;

a shading device also disposed within said globe body for shading light from the illumination device over a substantially half region of the globe body;

second support means for rotatably supporting the shading device relative to the globe body around a second axis corresponding substantially to an axis perpendicular to the orbital plane of revolution of the earth;

a first drive device for rotating the globe body around the first axis at a first rotational speed; and a second drive device for rotating the shading device around the second axis at a second rotational speed different from the first rotational speed.

With the present invention thus constructed, when the illumination device emits light, the light is shaded by the shading device over the region substantially half the globe body, so that the user can recognize this region as a night region while he can recognize the other region as a day region. As the first and second drive devices are operated to rotate the globe body and the shading device, respectively, the night region and the day region are changed with the lapse of time.

The invention will become more fully apparent from the claims and the description as it proceeds in connection with the drawings.

DETAILED DESCRIPTION OF THE PREFERRED EMBODIMENT

Figure 1:
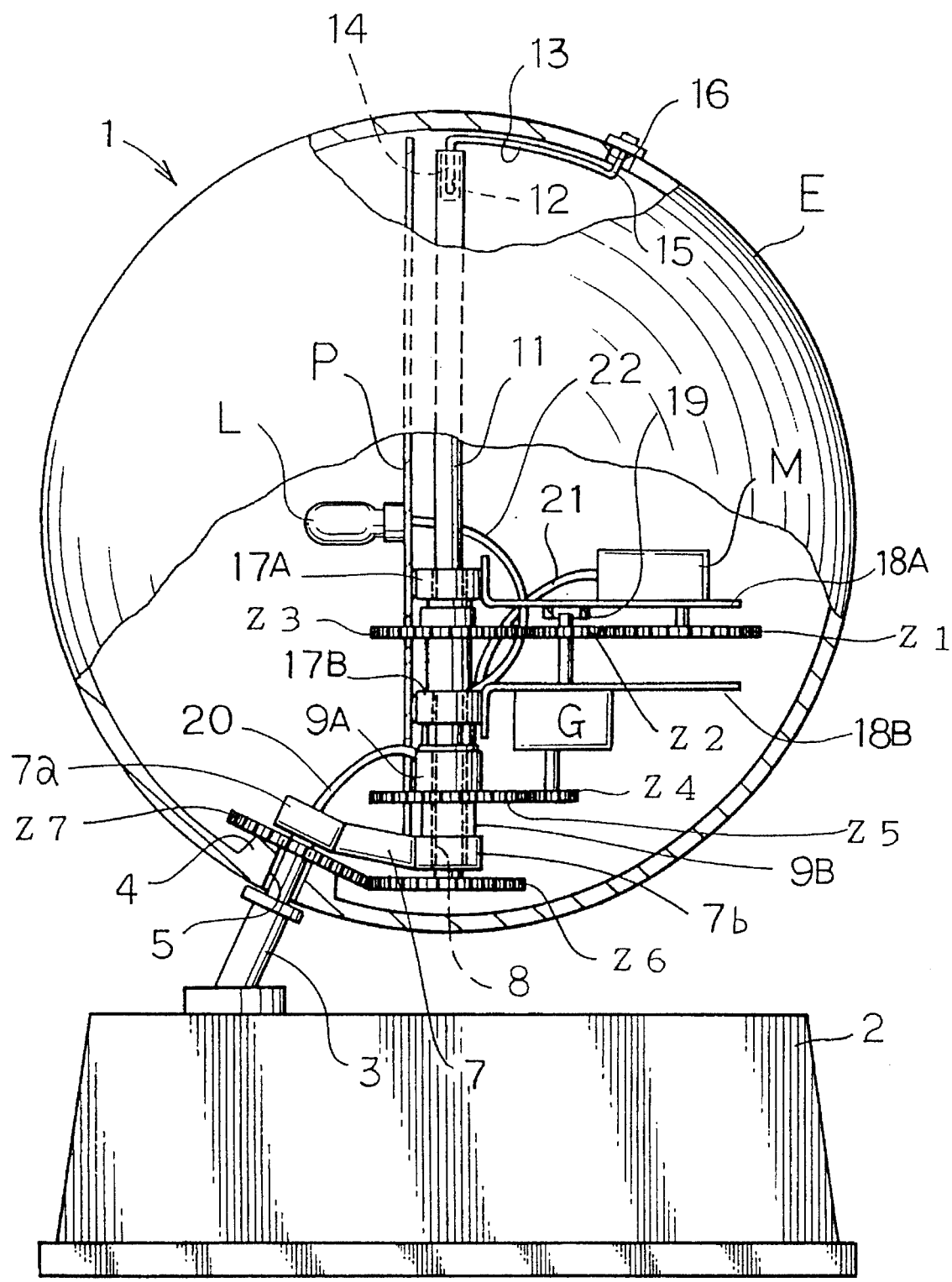
FIG. 1 is a front view, with a part broken away, of an earth globe according to an embodiment of the present invention.

Referring now to FIGS. 1 to 4, an earth globe 1 according to a preferred embodiment of the present invention will be described. For convenience in describing the relative positions of several components, the left end of the earth globe 1 shown in FIG. 1 is referred to as the front of the earth globe 1, and forward and rearward parts will be in relation to this front of the earth globe 1.

As shown in FIG. 1, the earth globe 1 includes a substantially rectangular base 2 having a longitudinal axis. A tubular support shaft 3 is fixedly mounted on a forward portion of the base 2. The support shaft 3 extends upwardly rearwardly from the base 2 within a plane parallel to the longitudinal axis of the base 2. The support shaft 3 has an axis inclined at an angle of about 23.5° relative to the vertical axis or axis of a rotary shaft 11 which will be explained later.

The earth globe 1 further includes a hollow globe body E made of translucent plastic material which may prevent the view of the interior of the globe body E. The globe body E has a thick wall part 4 which protrudes inwardly toward the center of the globe body E and which includes a through hole 5 formed therein. The through hole 5 receives an upper part of the support shaft 3, so that the globe body E is rotatable around the axis of the support shaft 3 which axis is inclined as described above. A world map (not shown) is drawn on the outer surface of the globe body E with the axis of the support shaft 3 taken as the earth axis.

Figure 2:
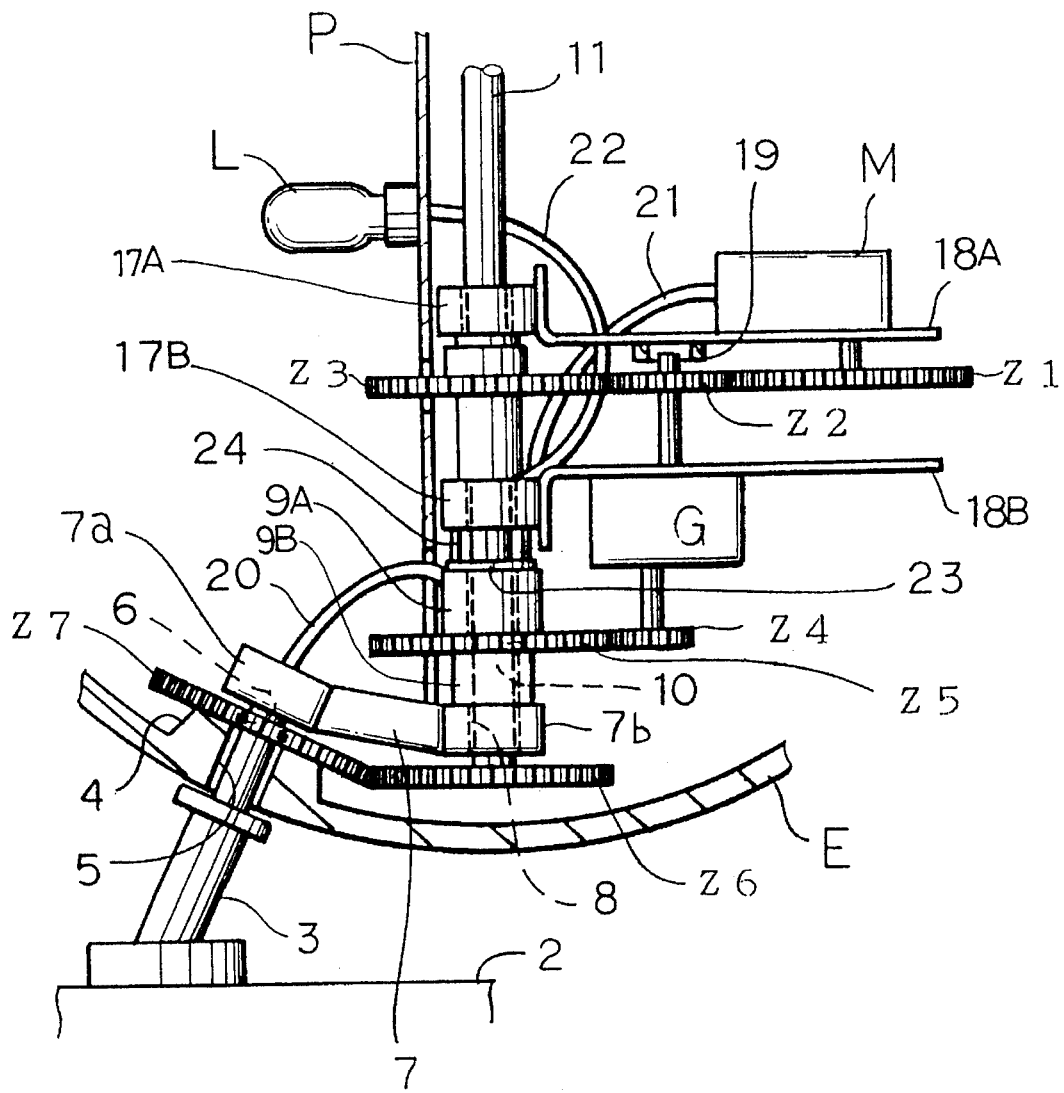
FIG. 2 is an enlarged view of the essential parts of the earth globe shown in FIG. 1.

As shown in FIG. 2, a gear Z7 is fixed to the inner surface of the wall part 4 and includes a central hole 6 which is in alignment with the through hole 5. The upper part of the support shaft 3 extends further upwardly through the central hole 6 and protrudes slightly into the globe body E.

An arm 7 includes a first end 7a fixedly mounted on the upper end of the support shaft 3. The arm 7 extends rearwardly along the bottom within the interior of the globe body E and has a second end 7b having a vertical through hole 8 formed therein. A gear Z5 having an upper and a lower boss portion 9A and 9B formed thereon is fixedly mounted on the upper surface of the second end 7b of the arm 7 and includes a central hole 10 formed in alignment with the through hole 8. A rotary shaft 11 is rotatably inserted into the central hole 10 and the through hole 8 and extends vertically through the center of the globe body E to reach the upper portion of the interior of the globe body E. A gear Z3 is fixedly mounted on the rotary shaft 11 at a position slightly lower than the center of the globe body E. A gear Z6 is fixedly mounted on the lower end of the rotary shaft 11. The gear Z6 is in engagement with the gear Z7.

As shown in FIG. 1, an axial hole 12 is formed on the upper end of the rotary shaft 11 for rotatably receiving a finger 14 formed on a forward end of a support arm 13. The support arm 13 has an arcuate configuration having a curvature corresponding to the curvature of the inner surface of the globe body E and extends along the inner surface of the globe body E. The arm 13 has a support portion 15 at its rear end. The support portion 15 extends in a direction corresponding to the axis of the support shaft 3 and is rotatably inserted into a support hole 16 which is formed on the globe body E at a position opposite to the through hole 5, so that the globe body E is rotatably supported around the axis of the support shaft 3.

Tubular rings 17A and 17B are rotatably fitted around on the rotary shaft 11 and are positioned above and below the gear Z3, respectively. Horizontal upper and lower mounting plates 18A and 18B are fixed to the tubular rings 17A and 17B, respectively, and are joined to each other by a joint member (not shown) to form a mounting frame, so that they are rotatable together around the rotary shaft 11.

A drive source or motor M is mounted on the upper mounting plate 18A and has an output shaft on which a gear Z1 is fixedly mounted. A speed reducer G is mounted below the lower mounting plate 18B and has an input shaft on which a gear Z2 is fixedly mounted. The input shaft extends upwardly through the lower mounting plate 18B and has an upper end which is positioned slightly above the gear Z2 and which is rotatably supported by an annular support member 19 mounted on the underside of the upper mounting plate 18A. The gear Z2 is positioned between the gear Z1 and the gear Z3 and is in engagement with these two gears, so that the rotation of the gear Z1 driven by the motor M is transmitted to the gear Z3 and the speed reducer G, respectively. The speed reducer G has an output shaft on which a gear Z4 is fixedly mounted. The gear Z4 is in engagement with the gear Z5. Here, the number of teeth of the gears Z1, Z3, Z5, Z6 and Z7 is determined as 120, the number of teeth of the gear Z2 as 58, and the number of teeth of the gear Z4 as 30. The rotational direction of the output shaft of the speed reducer G is the same as the rotational direction of its input shaft. The reduction ratio of the speed reducer can be selectively adjusted.

A vertical shading plate P is fixedly mounted on the tubular rings 17A and 17B. An illuminating device or lamp L is mounted on substantially the central portion of the shading plate P. The shading plate P has a substantially disc-like configuration having a diameter slightly smaller than the inner diameter of the globe body E, so that the interior of the globe body E is divided into two hemispherical spaces (two halves). When the mounting frame comprising the mounting plates 18A and 18B is rotated around the rotary shaft 11, the lamp L as well as the shading plate P is also rotated together therewith. Further, when the lamp L is lit, one of the halves (the left side half in FIG. 1) of the globe body E is bright when viewed from the outside, while the other of the halves (the right side half in FIG. 1) is dark when viewed since the light is shaded by the shading plate P.

A power to the motor M and the lamp L is supplied from a battery (not shown) disposed within the base 2. The power may be supplied through an indoor wire or domestic socket outlet. As shown in FIG. 2, a line 20 from the battery is passed through the tubular support shaft 3 to enter the interior of the globe body E and is connected to a conductor ring 23 which is mounted on the upper boss portion 9A of the gear Z5. A brush 24 cooperates with the conductor ring 23 to form a rotary contact and is mounted on the lower surface of the tubular ring 17B. Lines 21 and 22 from the motor M and the lamp L, respectively, are connected to the brush 24, so that the power can be supplied to the motor M and the lamp L while the tubular ring 17B is rotated relative to the gear Z5.

Figure 3:
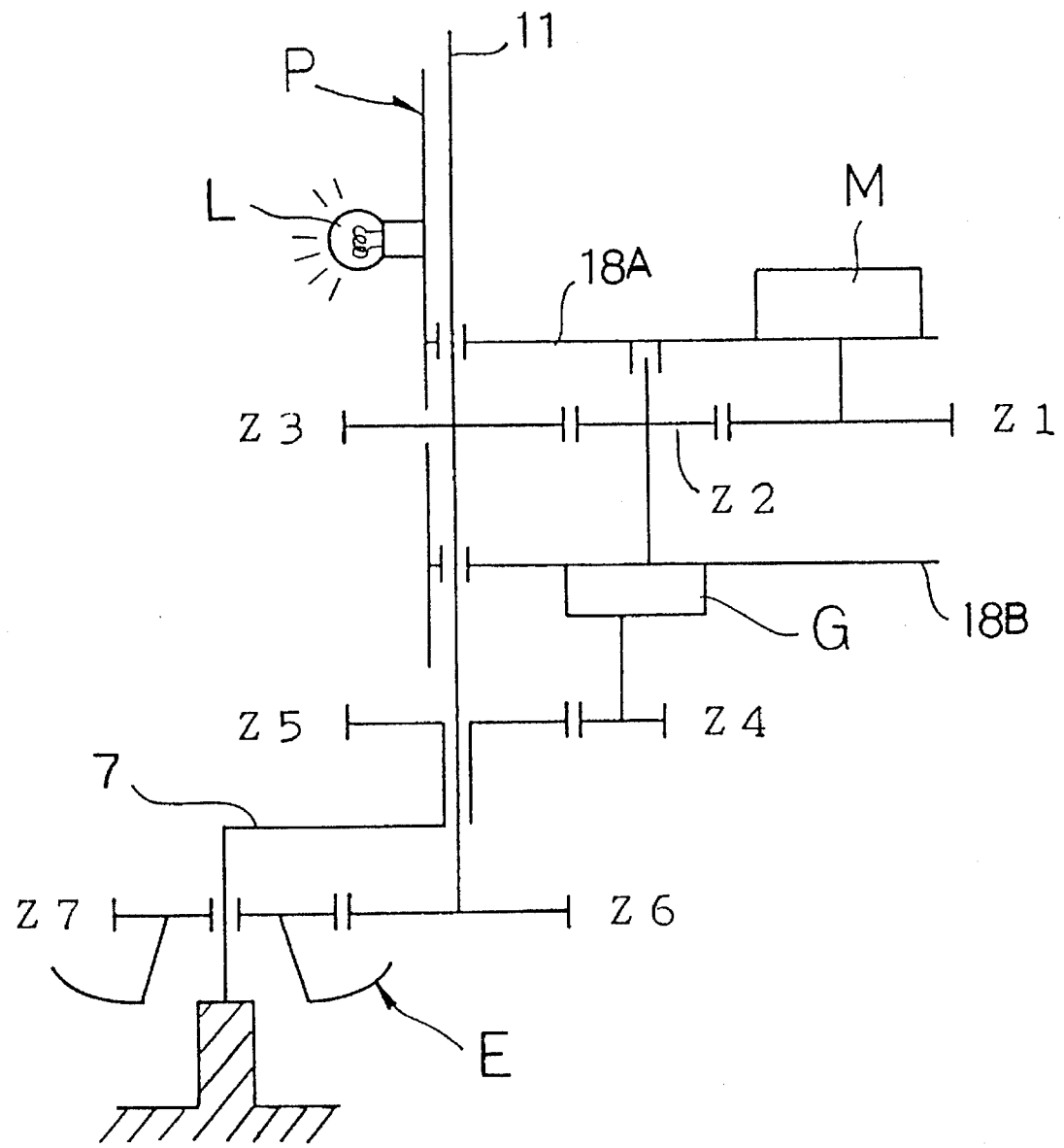
FIG. 3 is a schematic view of a driving mechanism of the earth globe.

The operation of the earth globe i thus constructed will now be described with reference to FIG. 3.

In this embodiment, the motor M serves to rotate the globe body E and also to rotate the lamp L and the shading plate P. As for the rotation of the globe body E, when the motor M is driven to rotate the gear Z1 in a clockwise direction (as viewed from the top of FIG. 1), the gear Z2 is rotated in a counterclockwise direction. Then, the gear Z3 is rotated in the clockwise direction, and the rotary shaft 11 and the gear Z2 as well as the gear Z6 are rotated in the clockwise direction, so that the gear Z7 in engagement with the gear Z6 is rotated in the counterclockwise direction, and that the globe body E to which the gear Z7 is fixed is rotated in the counterclockwise direction.

As for the rotation of the lamp L and the shading plate P, when the gear Z1 is rotated in the clockwise direction as described above, such rotation is transmitted to the speed reducer G via the gear Z2. Since the rotational direction of the output shaft of the speed reducer G is the same as the input shaft thereof, the counterclockwise rotation of the gear Z2 is transmitted to the gear Z4 of the output shaft in the same direction. Since the gear Z5 in engagement with the gear Z4 is fixed in position, the gear Z4 is rotated around its own axis in the counterclockwise direction while revolving around the gear Z5 in the counterclockwise direction, so that the lamp L and the shading plate P as well as the mounting frame including the mounting plates 18A and 18B are rotated in the counterclockwise direction around the rotary shaft 11.

Thus, with this embodiment, when the motor M is driven in the clockwise direction, the globe body E is rotated in the clockwise direction while the lamp L and the shading plate P are rotated in the counterclockwise direction. The reduction ratio of the speed reducer G is determined such that the ratio of the rotational speed of the globe body E to the rotational speed of the lamp L and the shading plate P is 366:1 which corresponds to the ratio of 365 (number of rotation of the earth in a year)+1 (number of rotation of the earth due to revolution around the sun) to 1 (number of revolution of the earth in a year).

Figure 4:
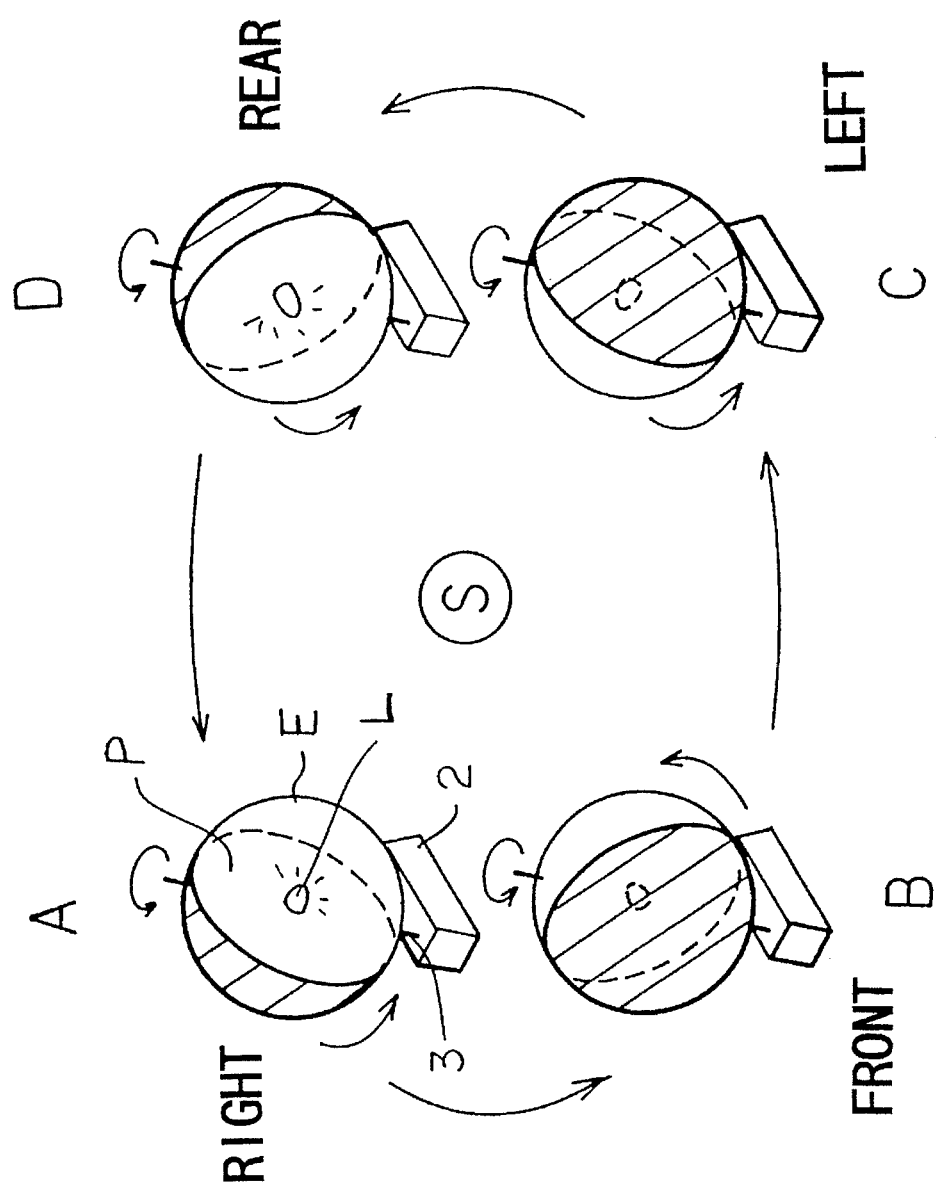
FIG. 4 is a schematic view showing the operation of the earth globe.
Figure 5:
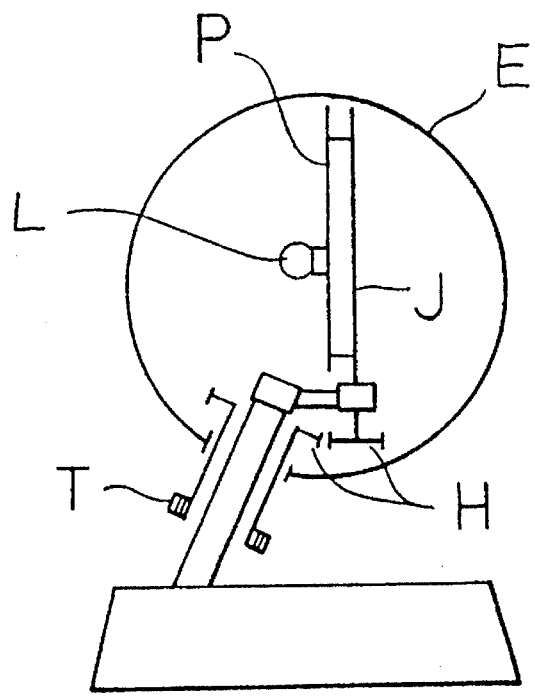
FIGS. 5 and 6 are schematic views showing conventional earth globes.
Figure 6:
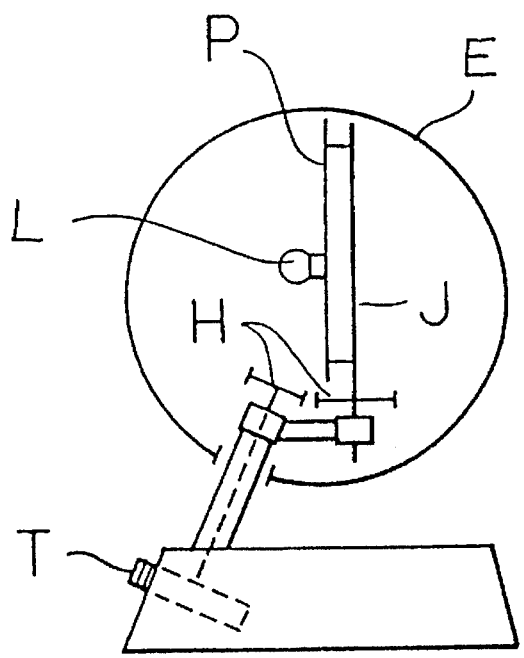

The rotational operation of the globe body E, the lamp L and the shading plate P will now be described with reference to FIG. 4 in connection with the position of the earth along the revolution orbit. The earth rotates around the earth axis in the counterclockwise direction, while it revolves around the sun S in the counterclockwise direction. As described above, with the earth globe I of this embodiment, the globe body E, the lamp L and the shading plate P rotate also in the counterclockwise direction.

When the earth or the globe body E is at Position A where the Northern Hemisphere of the earth is spring, the shading plate P is positioned in parallel to the longitudinal axis of the base 2 or in parallel to the support shaft 3, so that light from the lamp L is irradiated to the left side hemisphere (the side facing the sun S) of the globe body E or the earth. When the globe body E is brought to Position B where the Northern Hemisphere is summer, the shading plate P is rotated by an angle of 90° in the counterclockwise direction and is positioned perpendicular to the longitudinal axis of the base 2, so that the light from the lamp L is irradiated to the rear side hemisphere (the side facing the sun S) of the globe body E. When the globe body E is brought to Position C where the Northern Hemisphere is autumn, the shading plate P is further rotated by an angle of 90° in the counterclockwise direction and is positioned in parallel to the longitudinal axis of the base 2, so that the light is irradiated to the right side hemisphere (the side facing the sun S) of the globe body E. When the globe body E is brought to Position D where the North Hemisphere is winter, the shading plate P is further rotated by an angle of 90° in the counterclockwise direction and is positioned perpendicular to the longitudinal axis of the base 2, so that the light is irradiated to the front side hemisphere (the side facing the sun S) of the globe body E. The globe body E thereafter returns Position A to complete the revolution around the sun S and the rotations around the earth axis during one year. As described above, with this embodiment, while the position is changed as A-B-C-D-A, the lamp P as well as the shading plate P is rotated one time while the globe body E is rotated 366 times, so that the earth globe 1 can reproduce the change of the seasons as viewed from the outside (outer space) during one year.

With the earth globe 1 of this embodiment, the globe body E and the lamp L or the shading plate P are synchronously rotated with each other, so that the user can visually grasp the rotation and the revolution of the earth as well as the change of day and night (change of region on which the sunlight is irradiated) in connection with the rotation and the revolution of the earth. The user can recognize such changes realistically since the rotational speed of the globe body E and the rotational speed of the lamp L or the shading plate P are determined to correspond to the rotational speed and the revolving speed of the earth, respectively. Further, since the globe body E, the lamp L and the shading plate P are driven by the motor M, the drive mechanism of these members is relatively simple in construction. Additionally, since the whole drive mechanism is accommodated within the interior of the globe body E, the earth globe 1 is simple in appearance.

In the above embodiment, the rotation of the motor M is transmitted to the globe body E and to the lamp L or the shading plate P by means of a first gear mechanism including gears Z1, Z2, Z3, Z6 and Z7 and a second gear mechanism including gears Z1, Z2, Z4 and Z5, respectively, and the rotational speed of the globe body E, etc. can be selectively determined by changing the number of teeth of each gear and the reduction ratio of the speed reducer G. Further, a belt-type transmission mechanism, a chain-type transmission mechanism or a frictional transmission mechanism may be used in place of the first or the second gear mechanism.

Although, in the above embodiment, the motor M is disposed on the upper mounting plate 18A, the motor M may be mounted on the lower mounting plate 18B. Alternatively, the motor M may be disposed on the base 2 or outside of the globe body E so as to directly drive the globe body E. In this case, the rotation of the globe body E is transmitted to the gear Z6 via the gear Z7 and thereafter to the rotary shaft 11 and the gear Z3. The rotation of the gear Z3 is further transmitted to the speed reducer G via the gear Z2, so that the gear Z4 is rotated to revolve around the gear Z5 which is fixed in position. Consequently, the mounting frame including the mounting plates 18A and 18B is rotated together with the shading plate P and the lamp L around the rotary shaft 11.

Although in this embodiment, the disc-like shading plate P is incorporated as a shading device, a hollow hemispherical shading member made of non-translucent material may be used in place of the shading plate P. Such a hemispherical shading member may be fixed to the mounting frame such that the shading member is positioned behind the lamp P, and the outer peripheral surface of the shading member extends along the inner surface of the globe body E (more specifically, the shading member may be disposed inside of the right side hemisphere of the globe body E in FIG. 1). When the mounting frame is rotated with the lamp L lit, the shading member is rotated along the inner surface of the globe body E while shading the light from the lamp L.

Additionally, the rotary contact comprising the conductor ring 23 and the brush 24 may be replaced by a rotary contact comprising a pair of rotary rings and an intermediate conductive ring interposed therebetween. An annular protrusion is formed on each of the rotary rings and is in engagement with the inner peripheral surface of the intermediate conductive ring. Each of the rotary rings has a ring body made of insulation material and includes a conductive member which is disposed within the ring body for contacting the intermediate conductive ring and which is connected to the line 20 from the battery or the lines 21 and 22 from the motor M and the lamp L, respectively, via the ring body. A spring may be provided for normally keeping the contact relationship between these elements.

Further, the battery may be disposed within the globe body E. A solar battery may be used as the battery if it is disposed outside of the globe body E.

While the invention has been described with reference to a preferred embodiment thereof, it is to be understood that modifications or variation may be easily made without departing from the spirit of this invention which is defined by the appended claims.

What is claimed is:

1. An earth globe comprising:

a base;

a hollow globe body made of translucent material and having a spherical configuration corresponding substantially to the earth;

first support means for supporting said globe body relative to said base said globe body being rotatable around a first axis corresponding substantially to the earth axis;

illumination means disposed within said globe body for illuminating the interior thereof;

shading means also disposed within said globe body for shading light from said illumination means over a substantially half region of said globe body;

second support means for rotatably supporting said shading means relative to said globe body around a second axis corresponding substantially to an axis which is perpendicular to the orbital plane of revolution of the earth;

first drive means for rotating said globe body around said first axis at a first rotational speed;

second drive means for rotating said shading means around said second axis at a second rotational speed different from said first rotational speed; and motor means positioned within said globe body and for activating said first and said second drive means.

2. The earth globe as defined in claim 1 wherein the ratio of said first rotational speed to said second rotational speed is substantially equal to the ratio of the rotational speed of the earth about its own axis and the revolution speed of the earth around the sun.

3. The earth globe as defined in claim 1, wherein both said first and second drive means are driven by a single drive source.

4. The earth globe as defined in claim 1 wherein said first and second drive means are driven in synchronism.

5. The earth globe as defined in claim 1 wherein said first and second drive means are disposed within said globe body.

6. The earth globe as defined in claim 1 wherein said first support means includes a fixed shaft extending in the direction of said first rotational axis, said fixed shaft being fixed to said support base and having an upper portion extending through said globe body into the interior thereof, and wherein said second support means includes a support shaft extending in the direction of said second rotational axis and mounted on said fixed shaft by means of an arm within the interior of said globe body.

7. The earth globe as defined in claim 6 including a support frame for supporting said shading means, a motor mounted on said support frame for driving said first and second drive means, said support frame being mounted on said support shaft so as to rotate around said second rotational axis, said first drive means including a first rotation transmission means for transmitting rotation of said motor to said globe body via said support shaft, and said second drive means including a second rotation transmission means for transmitting rotation of said motor to said support frame so as to rotate said support frame around said support shaft.

8. The earth globe as defined in claim 7 wherein said first rotation transmission means includes first gear means and second gear means, said first gear means being interposed between a motor shaft of said motor and said support shaft, said second gear means being interposed between said support shaft and a part of said globe body, and wherein said second rotation transmission means includes third gear means interposed between said motor shaft and said arm.

9. The earth globe as defined in claim 8 wherein said third gear means includes a speed reducer device.

10. The earth globe as defined in claim 7 wherein said illuminating means is mounted on said support frame.

11. An earth base comprising:

a base;

a hollow globe body made of translucent material and having a spherical configuration corresponding substantially to the earth;

a fixed shaft secured to said base and having an upper portion extending through and into said globe body, said fixed shaft rotatably supporting said globe body around a first rotational axis corresponding substantially to the earth axis;

support means mounted on said fixed shaft and disposed within said globe body;

a support frame supported by said support means and rotatable around a second rotational axis corresponding substantially to an axis perpendicular to the orbital plane of revolution of the earth;

illumination means mounted on said support frame;

shading means also mounted on said support frame for shading light from said illumination means over a substantially half region of said globe body;

a motor mounted on said support frame;

first power transmission means for transmitting rotation of said motor to said globe body so as to rotate said globe body at a first rotational speed; and second power transmission means for transmitting rotation of said motor to said support frame so as to rotate said support frame at a second rotational speed different from said first rotational speed.

12. The earth globe as defined in claim 11 wherein said support means includes a boss portion fixed to said fixed shaft via an arm, a rotary shaft inserted into said boss portion and rotatable relative to said boss portion around said second rotational axis, and said support frame is supported on said boss portion in facing relationship therewith in a vertical direction, so that said support frame is slidably rotatable relative to said boss portion and to said rotary shaft.

13. The earth globe as defined in claim 12 wherein said first power transmission means includes first gear means for transmitting rotation of said motor to said globe body via said rotary shaft, and said second power transmission means includes second gear means disposed between said boss portion and said motor.

14. The earth globe as defined in claim 13 wherein said first gear means includes a first gear train disposed between said motor and said rotary shaft and includes a second gear train disposed between said rotary shaft and said globe body.

15. The earth globe as defined in claim 13 wherein said second gear means includes a speed reduction means.

* * * * *